Figure 1:
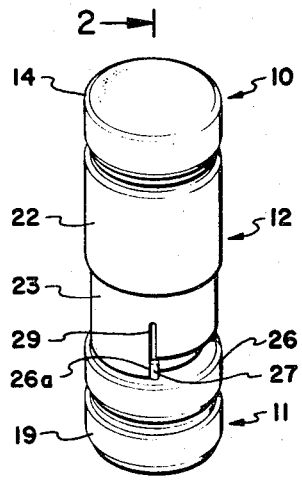

Oct. 3, 1967    D. W. FLOOR    3,344,461

CONTACT LENS HANDLING APPARATUS

Filed Oct. 23, 1965    2 Sheets-Sheet 1

INVENTOR.
DENNIS W. FLOOR
BY
MALLINCKRODT & MALLINCKRODT
ATTORNEYS

Oct. 3, 1967 D. W. FLOOR 3,344,461
CONTACT LENS HANDLING APPARATUS
Filed Oct. 23, 1965 2 Sheets-Sheet 2

INVENTOR.
DENNIS W. FLOOR
BY
MALLINCKRODT & MALLINCKRODT
ATTORNEYS

United States Patent Office 3,344,461
Patented Oct. 3, 1967

3,344,461
CONTACT LENS HANDLING APPARATUS
Dennis W. Floor, 346 East 3360 South,
Salt Lake City, Utah 84115
Filed Oct. 23, 1965, Ser. No. 503,147
9 Claims. (Cl. 15—512)

This invention relates to handling apparatus for contact lenses, and particularly to apparatus used to store, clean and place them.

At the present time there are a great many containers available for storing and carrying contact lenses. These generally have separate, marked compartments for each lens of the pair and some include pockets or straps for holding bottles of cleaning solutions therein. They vary widely as to size, but many of them can be carried in a woman's handbag or in a trouser pocket, although they are much more bulky than is desired. The cleansing solution is wiped on and off the lenses using wiping cloths or tissues that must be separately carried.

In U.S. Patent No. 3,150,406, issued Sept. 29, 1964 to M. L. Obitts, there is disclosed a kit for storing contact lenses that includes an arrangement in which a lens to be cleaned is gripped by tongs and is longitudinally reciprocated within a washway formed between sponge surfaces in a fluid reservoir. After it has been cleaned, the lens is transferred onto an end coil of a spring shaped lens holder that holds the lens as it is placed against the eye of a wearer.

It is an object of the present invention to provide a compact carrying and storing container for contact lenses that includes means for securely immobilizing a lens while its faces are cleaned with a circular rubbing action and for placing the lens against the eye of the user, without requiring any handling that can contaminate the lens after cleaning.

Prinpical features of the invention include separate carrying and storing compartments for right and left eye lenses, a rolled gripping tube for securely and safely holding a lens placed therein by its edges, and a pair of solution retaining pads arranged to contact the opposite faces of a lens being cleaned and to be rotated to scrub the faces, one of the pads being movable to position the lens such that it can readily be placed against the eye of a user without his contacting the lens with his fingers.

There is shown in the accompanying drawings a specific embodiment of the invention representing what is presently regarded as the best mode of carrying out the generic concepts in actual practice. From the detailed description of this presently preferred form of the invention, other more specific objects and features will become apparent.

Figure 2:
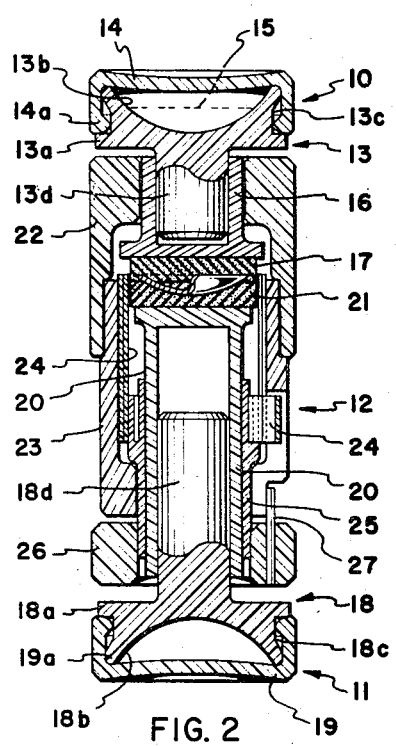
Figure 3:
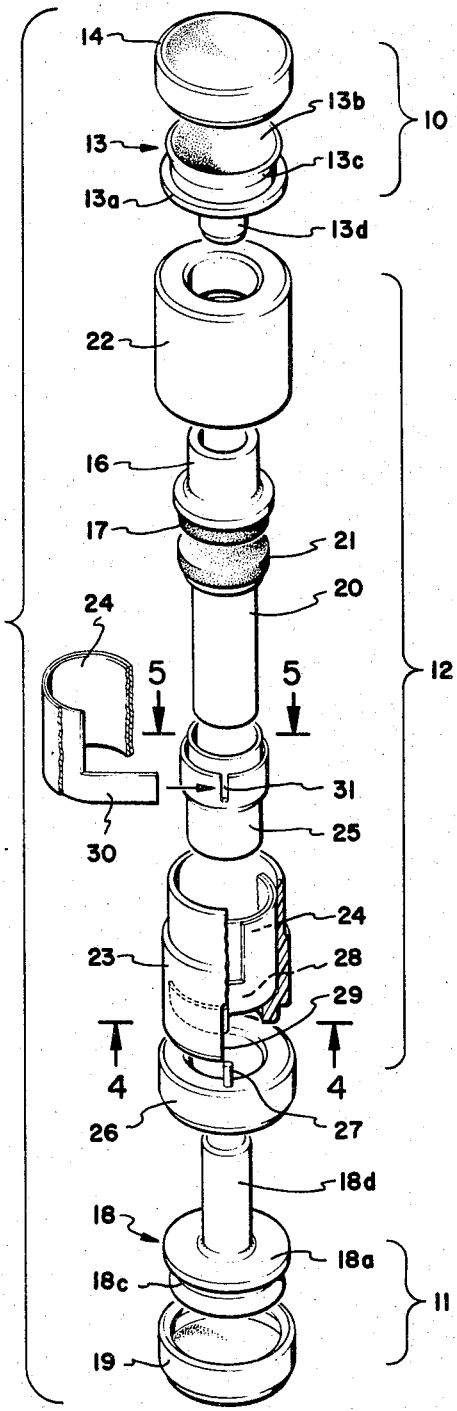
Figure 4:
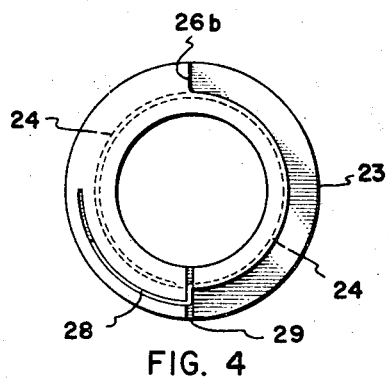
Figure 6:
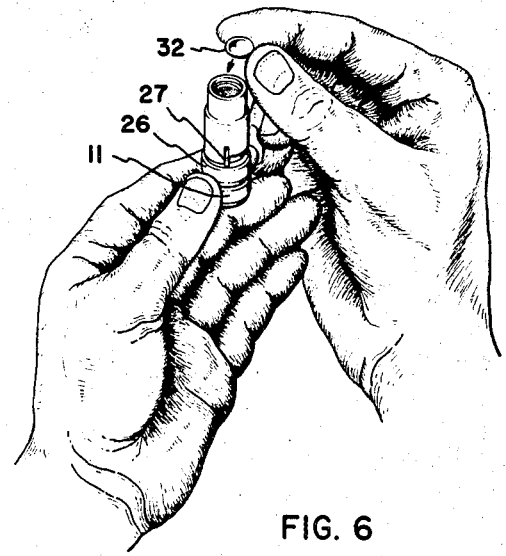
Figure 5:
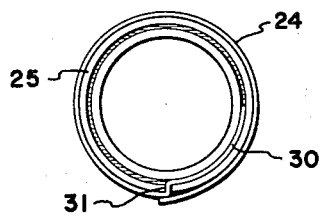
Figure 7:
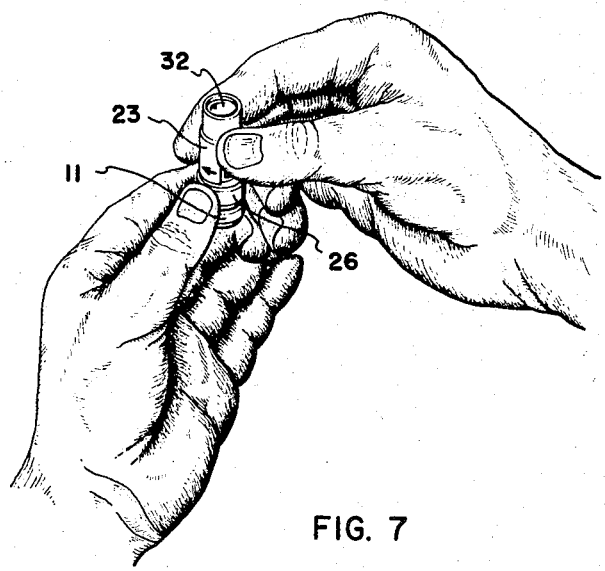

In the drawings:

FIG. 1 is a view in perspective showing the contact lens holder and cleaner of the invention;

FIG. 2, an enlarged view in vertical section, taken on the line 2—2 of FIG. 1;

FIG. 3, an exploded perspective view of the component parts;

FIGS. 4 and 5, enlarged horizontal sections taken on the lines 4—4, and 5—5, respectively, of FIG. 3; and FIGS. 6, and 7, perspective views showing how a lens is positioned to be cleaned.

Referring now to the drawings:

In the illustrated preferred embodiment, the invention comprises a pair of end compartments, shown generally at 10 and 11 that are adapted to receive the lenses of a pair of lenses for carrying and storing and a central cleaning section shown generally at 12.

End compartment 10 comprises a receiver member 13 and a cap 14 therefore. Receiver member 13 includes an enlarged head 13a having a preferably concave, recessed surface 13b and a surrounding groove 13c. A bead 14a, formed interiorly of the preferably somewhat resilient cap 14 is adapted to be snapped tightly into groove 13c to hold the cap on the receiver member and a lens 15, shown in broken lines in FIG. 2, is placed on the recessed surface with its convex face resting on the concave recessed surface. A post 13d protrudes from the enlarged head and fits tightly into one end of a sleeve 16 that carries a soft, absorbent, pad 17 at its other end.

End compartment 11 is similar to end compartment 10 and includes a receiver member 18, and a cap 19 adapted to fit thereon. Receiver member 18 has an enlarged head 18a, with a preferably concave, recessed surface 18b adapted to receive a lens, and a surrounding groove 18c. A bead 19a on the preferably somewhat resilient cap 19 is adapted to be snapped tightly into groove 18c to hold the cap securely on the receiver member. A stem 18d protrudes from head 18a and fits tightly into one end of a sleeve member 20 that has a soft, absorbent, pad 21 on its other end.

Sleeve 16 surrounds post 13d so tightly that it is rotatable and slideable therewith inside exterior cap member 22.

Cap member 22 tightly, but removably telescopes over an exterior body member 23 that anchors one end of a rolled gripping member 24, the other end of which is fixed to a member 25 that rotatably surrounds the sleeve member 20 and that is fixed for rotation with a collar 26. A pin 27, protruding from collar 26 frictionally engages a portion of the exterior body member 23 to hold the collar 26 in its set position, and stops 26a and 26b, FIG. 4, are positioned to be contacted by pin 27 to limit the extent of rotation of the collar.

Rolled gripping member 24 has a tab 27 at its outer end that is held within a groove 29 in the exterior body member and another tab 30 at its inner end that is held by insertion through slot 31 of member 25. The gripping member surrounds and extends beyond member 25 and pad 21 to encircle the pad.

To prepare the invention to receive a contact lens for cleaning, it is only necessary to remove cap member 22 and the end compartment 10, sleeve 16 and pad 17 carried thereby from the exterior body member 23, and to rotate exterior body member 23 counter-clockwise while holding collar 26, or conversely to hold member 23 while rotating collar 26 clockwise. This expands the area within the rolled gripping member 24 and allows the lens to be easily placed therein. The stops 26a and 26b prevent the collar 26 being rotated so far that the gripping member is pulled loose from its connections with exterior body member 23 and member 25.

The pads 17 and 21 can at this time be saturated with a cleaning solution, but it should be understood that this will not have to be done each time a lens is cleaned since the pads will hold a sufficient amount of cleaning solution to last for a period of time.

As illustrated in FIG. 6, a lens 32 is then positioned inside the rolled gripping member with its convex surface resting on the pad 21.

As illustrated in FIG. 7, clockwise rotation of the exterior body member 23, while collar 26 is held, will close the rolled gripping member to tightly hold the peripheral edge of the lens.

Cap member 22, and the end compartment 10, sleeve 16 and pad 17 carried thereby are then replaced on the exterior body member and the cap member 22 and exterior body member 23 are held while the heads 13a and 18a of end compartments 13 and 18, respectively, are rotated. This turns pads 17 and 21 to clean the opposite faces of the contact lens. Similarly, the end compartments 10 and 11 can be held between a thumb and finger for example while the central cleaning section 12 is rotated to clean both faces of the lens.

After the lens has been cleaned cap member 22 and the parts carried thereby are removed from exterior body member 23. Collar 26 is rotated counter-clockwise with respect to the exterior body member and rolled gripping member 24 is opened.

End compartment 11 and the sleeve 20 tightly fitted thereon are then pushed through the member 25 to position pad 21 beyond the end of rolled gripping member 24. At this time the lens 32 is balanced on the pad 21 and it is completely free of all other structure. By grasping exterior end container 11, the user can manipulate the lens into proper position against his eye. The pad 21 is sufficiently resilient to allow the lens to rock or otherwise yield as required during such placement and the liquid used to saturate the pad holds the lens on the pad until it has been properly positioned against the eye.

The entire apparatus can be constructed to be no more than about 1½ inches in length and ½ inch in diameter. It is preferably made out of a somewhat resilient plastic material that will not react chemically with the cleaning solution used, but it should be obvious that other materials can be employed.

Whereas there is here illustrated and specifically described a certain preferred construction of apparatus which is presently regarded as the best mode of carrying out the invention, it should be understood that various changes can be made and other constructions adopted without departing from the inventive subject matter particularly pointed out and claimed herebelow.

I claim:
1. Apparatus for handling contact lenses comprising end means, each including a pad for scrubbing the face of a contact lens; and
central means positioned between said end means for receiving and holding a contact lens to be scrubbed by rotation of the said pad means.
2. Apparatus according to claim 1, wherein the end means each include a storage compartment for a contact lens.
3. Apparatus according to claim 1, wherein the central means includes a rolled tube and operating means for closing said tube around the peripheral edge of a contact lens placed therein and for opening said tube.
4. Apparatus according to claim 3, wherein one of the end means is rotatable and reciprocable within the operating means to move the pad carried thereby into and beyond the rolled tube.
5. Apparatus according to claim 4, further including a cap member adapted to fit snugly over the operating means, the other of the end means being rotatable and reciprocatable within the cap member such that the pad carried thereby is engageable with a lens held within the rolled tube.
6. Apparatus according to claim 5, wherein the operating means includes an exterior body member through which the end means reciprocatable therewithin passes;
means fixing the outer end of the rolled gripping member to said exterior body member;
an interior member, surrounding the said end means, but positioned within the rolled gripping means;
means fixing the inner end of the rolled gripping means to the interior member; and
a collar fixed to said interior member and providing a gripping surface for rotating said interior member with respect to the exterior body member.
7. Apparatus according to claim 6, further including limit means for limiting rotation of the interior member with respect to the exterior body member.
8. Apparatus according to claim 7, wherein the limit means includes
abutment means on the collar; and
spaced stops on the exterior body member.
9. Apparatus according to claim 8, wherein the end means each include a storage compartment for a contact lens.

References Cited
UNITED STATES PATENTS

| | | | |
|---|---|---|---|
| 3,007,566 | 11/1961 | Morris | 206—5 |
| 3,035,589 | 5/1962 | King | 206—5 X |
| 3,056,998 | 10/1962 | Ebner | 15—512 |
| 3,063,083 | 11/1962 | Obitts | 15—512 |
| 3,135,987 | 6/1964 | Huch | 15—512 |
| 3,150,406 | 9/1964 | Obitts | 15—512 |

FOREIGN PATENTS

| | | |
|---|---|---|
| 685,129 | 4/1964 | Canada. |
| 1,259,440 | 3/1961 | France. |

CHARLES A. WILLMUTH, *Primary Examiner.*
R. I. SMITH, *Assistant Examiner.*